(12) United States Patent
Mason et al.

(10) Patent No.: US 11,041,932 B2
(45) Date of Patent: *Jun. 22, 2021

(54) ENHANCED LORAN (ELORAN) SYSTEM HAVING CORRECTED ADDITIONAL SECONDARY FACTOR (ASF) DATA

(71) Applicant: EAGLE TECHNOLOGY, LLC, Melbourne, FL (US)

(72) Inventors: Gary W. Mason, Rockledge, FL (US); William C. Adams, Jr., West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/282,371

(22) Filed: Feb. 22, 2019

(65) Prior Publication Data

US 2020/0271746 A1   Aug. 27, 2020

(51) Int. Cl.
 *G01S 1/24*   (2006.01)
 *G01S 1/02*   (2010.01)
 *G01S 1/08*   (2006.01)

(52) U.S. Cl.
 CPC .............. *G01S 1/245* (2013.01); *G01S 1/022* (2013.01); *G01S 1/08* (2013.01); *G01S 1/24* (2013.01)

(58) Field of Classification Search
 CPC . G01S 1/245; G01S 1/022; G01S 1/24; G01S 1/08
 See application file for complete search history.

(56) References Cited

U.S. PATENT DOCUMENTS

| | | |
|---|---|---|
| 3,947,849 A | 3/1976 | Fehlner et al. |
| 4,024,382 A | 5/1977 | Fowler |
| 4,134,117 A | 1/1979 | Robinson et al. |
| 4,166,275 A | 8/1979 | Michaels et al. |
| 4,195,299 A | 3/1980 | Van Etten |
| 4,268,830 A | 5/1981 | Brodeur |
| 4,300,139 A | 11/1981 | Wurst et al. |
| 4,318,105 A | 3/1982 | Brodeur |
| 4,325,067 A | 4/1982 | Brodeur |
| RE31,254 E | 5/1983 | Brodeur |

(Continued)

OTHER PUBLICATIONS

Hwang et al., "An Analysis on ASF Variations and Temperature", copyright 2014, IEEE (Year: 2014).*

(Continued)

*Primary Examiner* — Erin F Heard
*Assistant Examiner* — Thomas M Hammond, III
(74) *Attorney, Agent, or Firm* — Allen, Dyer, Doppelt + Gilchrist, P.A.

(57) ABSTRACT

An enhanced LOng RAnge Navigation (eLORAN) system may include a plurality of eLORAN transmitter stations, and at least one eLORAN receiver device. The eLORAN receiver device may include an eLORAN receive antenna, an eLORAN receiver coupled to the eLORAN receive antenna, and a controller coupled to the eLORAN receiver. The controller may be configured to cooperate with the eLORAN transmitter stations to determine an eLORAN receiver position and receiver clock error corrected from additional secondary factor (ASF) data, the ASF data based upon different geographical positions and different times for each different geographical position.

14 Claims, 6 Drawing Sheets

(56) References Cited

U.S. PATENT DOCUMENTS

| | | | |
|---|---|---|---|
| RE31,962 | E | 7/1985 | Brodeur |
| 4,743,912 | A | 5/1988 | Enge et al. |
| 4,804,964 | A | 2/1989 | Takai et al. |
| 4,888,594 | A | 12/1989 | Sundquist et al. |
| 4,999,638 | A | 3/1991 | Schick |
| 5,105,196 | A | 4/1992 | Nolan et al. |
| 5,278,568 | A | 1/1994 | Enge et al. |
| 5,563,611 | A | 10/1996 | McGann et al. |
| 6,539,306 | B2 | 3/2003 | Turnbull |
| 7,782,983 | B2 | 8/2010 | Parakh et al. |
| 9,948,452 | B1 * | 4/2018 | Pearson ................. G01S 19/42 |
| 2009/0146864 | A1 * | 6/2009 | Zank .......................... G01S 1/24 342/22 |
| 2010/0220008 | A1 * | 9/2010 | Conover ................. G01S 1/245 342/357.29 |
| 2017/0160370 | A1 * | 6/2017 | Yakubisin ................ G01S 1/245 |
| 2017/0192102 | A1 * | 7/2017 | Wietfeldt .................. G01S 5/10 |
| 2018/0355629 | A1 * | 12/2018 | Dickey ..................... E04H 3/28 |
| 2021/0018586 | A1 | 1/2021 | Crandall |

OTHER PUBLICATIONS

Hargreaves et al., "ASF Quality Assurance for eLoran", copyright 2012, Crown (Year: 2012).*
Chris Hargreaves, "ASF Measurement and Processing Techniques, to allow Harbour Navigation at High Accuracy with eLoran", Sep. 2010, Dissertation submitted to The University of Nottingham (Year: 2010).*
Enge et al., Aiding GPS with Calibrated Loran-C, Navigation: Journal of The Institute of Navigation, vol. 35, No. 4, Mar. 1989, pp. 469-482.
Offermans et al., "Differential eLoran Trials in Harwich Harbour", Proceedings of the 2007 National Technical Meeting of the Institute of Navigation, Institute of Navigation, Jan. 2007, pp. 1167-1178.
Roth et al., "Development and Status of Integrated GPS/Loran Prototype for Aviation", Proceedings of the 60th Annual Meeting of the Institute of Navigation, The Institute of Navigation, Jun. 2004, pp. 448-454.
Celano et al., "Common-View LORAN-C as a Backup to GPS for Precise Time Recovery," Conference: Proceedings of 35th Annual Precise Time and Time Interval Meeting, Conference Paper, Dec. 2003, pp. 1-9.
Hargreaves et al., "ASF Quality Assurance for eLoran," Proceedings of the 2012 IEEE/ION Position, Location and Navigation Symposium, Apr. 23-26, 2012, pp. 1-2.
Offermans et al., "Providing a Resilient Timing and UTC Service Using eLoran in the United States," Navigation—Journal of The Institute of Navigation, vol. 64 Issue 3, Jun. 20, 2017, pp. 1-2.
W. J. Pelgrum, "New Potential of Low-Frequency Radionavigation in the 21st Century," Doctoral Thesis, Jan. 2006 (Summary Only) pp. 1-6.
Gunther et al., "Defining Primary, Secondary, Additional Secondary Factors for RTCM Minimum Performance Specifications (MPS)," Conference: 38th Annual Technical Symposium of the International Loran Association, 2009 , pp. 1-10.
Lombardi et al., "The Role of LORAN Timing in Telecommunications," Conference: Proceedings of Radio Technical Commission for Maritime Services Conference (RTCM), May 2006, pp. 1-21.
Johnson et al., "Feasibility Study of R-Mode using MF DGPS Transmissions," Issue: Final 1.0 / 7.03.2014. ACCSEAS Project, The Interreg IVB North Sea Region Programme, Nov. 3, 2014, pp. 1-59.
Marcus G. Graulich, "Weather Influence on Loran-C," Thesis, Dec. 16, 1987, pp. 1-158.
Depalma et al., "Seasonal Sensitivity Analysis of the St. Mary's River Loran-C Time Difference Grid" National Technical Information Service, Interim Report Jun. 1978, pp. 1-65.
"The National Academy of Sciences, National Research Council of the United States of America United States National Committee International Union of Radio Science," 1974 Annual Meeting Oct. 14-17, 1974, University of Colorado, Boulder, Colorado, pp. 1-200.
LORADD Series, Integrated GPS/eLoran receiver, "reelektronika," Installation and operational manual Version 1.2, 2009, pp. 1-54.
Luo et al., "ASF Effect Analysis Using an Integrated GPS/eLORAN Positioning System," Presented at the Institute of Navigation NTM 2006 Conference, Monterey, CA, Jan. 18-20, 2006, pp. 1-10.
Offermans et al., "eLoran for e-Navigation—The Requisite Co-Primary Source for Position, Navigation, Time and Data," Proceedings of the 2014 International Technical Meeting of The Institute of Navigation, Jan. 27-29, 2014, pp. 1-9.
Sarah Mahmood, Critical Infrastructure Vulnerabilities to GPS Disruptions, DHS S&T Efforts, Homeland Security Science and Technology, Jun. 4, 2014, pp. 1-17.

* cited by examiner

ENHANCED LORAN (ELORAN) SYSTEM HAVING CORRECTED ADDITIONAL SECONDARY FACTOR (ASF) DATA

FIELD OF THE INVENTION

The present invention relates to the field of navigation and, more particularly, to the enhanced LOng RAnge Navigation (eLORAN) system and related methods.

BACKGROUND OF THE INVENTION

The LOng RAnge Navigation (LORAN) system was developed in the United States during World War II. Subsequent implementations provided for enhancements in accuracy and usefulness, including LORAN-C and later enhanced LORAN (eLORAN) implementations. The eLORAN system is a low frequency radio navigation system that operates in the frequency band of 90 to 110 kHz and includes transmissions that propagate by ground wave. The eLORAN system transmits LORAN type navigation RF pulses at a center frequency of about 100 kHz and differs from LORAN-C in that eLORAN transmissions are synchronized to the UTC similar to GPS, and include time-of-transmission control, differential corrections similar to differential GPS, the use of "all-in-view" tracking, and one or more eLORAN data channels that provide low-rate data messaging, differential corrections, and almanac information.

With the rise of satellite-based navigation systems such as Global Positioning System (GPS), there has been relatively little development or investment in terrestrial-based navigation systems, such as the eLORAN system, until recently. A renewed interest in such systems has arisen regarding eLoran as a backup to satellite based navigation and timing systems, particularly since low frequency eLORAN signals are less susceptible to jamming or spoofing compared to the relatively higher frequency and lower powered GPS signals.

In current eLORAN systems, each eLORAN receiver is pre-loaded with a set of fixed, additional secondary factor (ASF) maps. The ASF map values are measured correction factors for the theoretical time-of-flight of the transmitted pulses for the path from transmitter to receiver. These correction factors are due to humidity, soil conductivity, and other environmental conditions. There is usually one unique ASF map per eLORAN transmitter. The values in these fixed ASF maps are interpolated and extrapolated at an eLORAN receiver from one-time ASF measurements that were acquired using a single moving ASF mapping receiver in a coarse grid across a coverage area of interest. For example, an ASF mapping vehicle could travel at high speed along selected roads making a single pass, and thus, acquire the values for implementing the ASF Map, which are stored in each eLORAN receiver. Reference stations that are located in populated areas or major ports that require more accurate eLORAN positioning may measure and distribute time-varying "local" ASF corrections that are valid in about 35 kilometer radius coverage circles from a reference station. These "local" ASF corrections are transmitted in near real-time via the eLORAN data channel (LDC).

There is a need for further developments in the eLORAN system to improve eLORAN system performance in certain applications.

SUMMARY OF THE INVENTION

In general, an enhanced LOng RAnge Navigation (eLORAN) system may include a plurality of eLORAN transmitter stations and at least one eLORAN receiver device having an eLORAN receive antenna and an eLORAN receiver coupled to the eLORAN receive antenna. A controller may be coupled to the eLORAN receiver and may be configured to cooperate with the plurality of eLORAN transmitter stations to determine an eLORAN receiver position and receiver clock error corrected based on Additional Secondary Factor (ASF) data. This ASF data may be based upon different geographical positions and different times for each geographical position.

The different times may be different seasons and different times of day. The controller may be configured to determine the eLORAN receiver position and receiver clock error corrected from the ASF data based upon at least one interpolation from the ASF data. The controller may comprise a memory configured to store the ASF data, and a processor cooperating with the memory.

In some embodiments, the controller may be configured to receive updated ASF data, for example, via a wireless data channel or via an eLORAN data channel. The eLORAN system may comprise a plurality of eLORAN reference stations. Each eLORAN transmitter station may comprise an eLORAN transmit antenna, and an eLORAN transmitter coupled to the eLORAN transmit antenna and configured to transmit a series of LORAN navigation RF pulses.

In yet another embodiment, an enhanced LOng RAnge Navigation (eLORAN) receiver device may comprise an eLORAN receive antenna and an eLORAN receiver coupled to the eLORAN receive antenna. A controller may be coupled to the eLORAN receiver and configured to cooperate with a plurality of eLORAN transmitter stations to determine an eLORAN position corrected from Additional Secondary Factor (ASF) data, which may be based upon different geographical positions and different times for each different geographic position.

Another aspect is directed to a method for enhanced LOng RAnge Navigation (eLORAN) position determination using an eLORAN receiver device comprising an eLORAN receive antenna, an eLORAN receiver coupled to the eLORAN receive antenna, and a controller coupled to the eLORAN receiver. The method may include operating the controller to cooperate with a plurality of eLORAN transmitter stations to determine an eLORAN receiver position and receiver clock error corrected from Additional Secondary Factor (ASF) data. This ASF data may be based upon different geographical positions and different times for each different geographical position.

DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
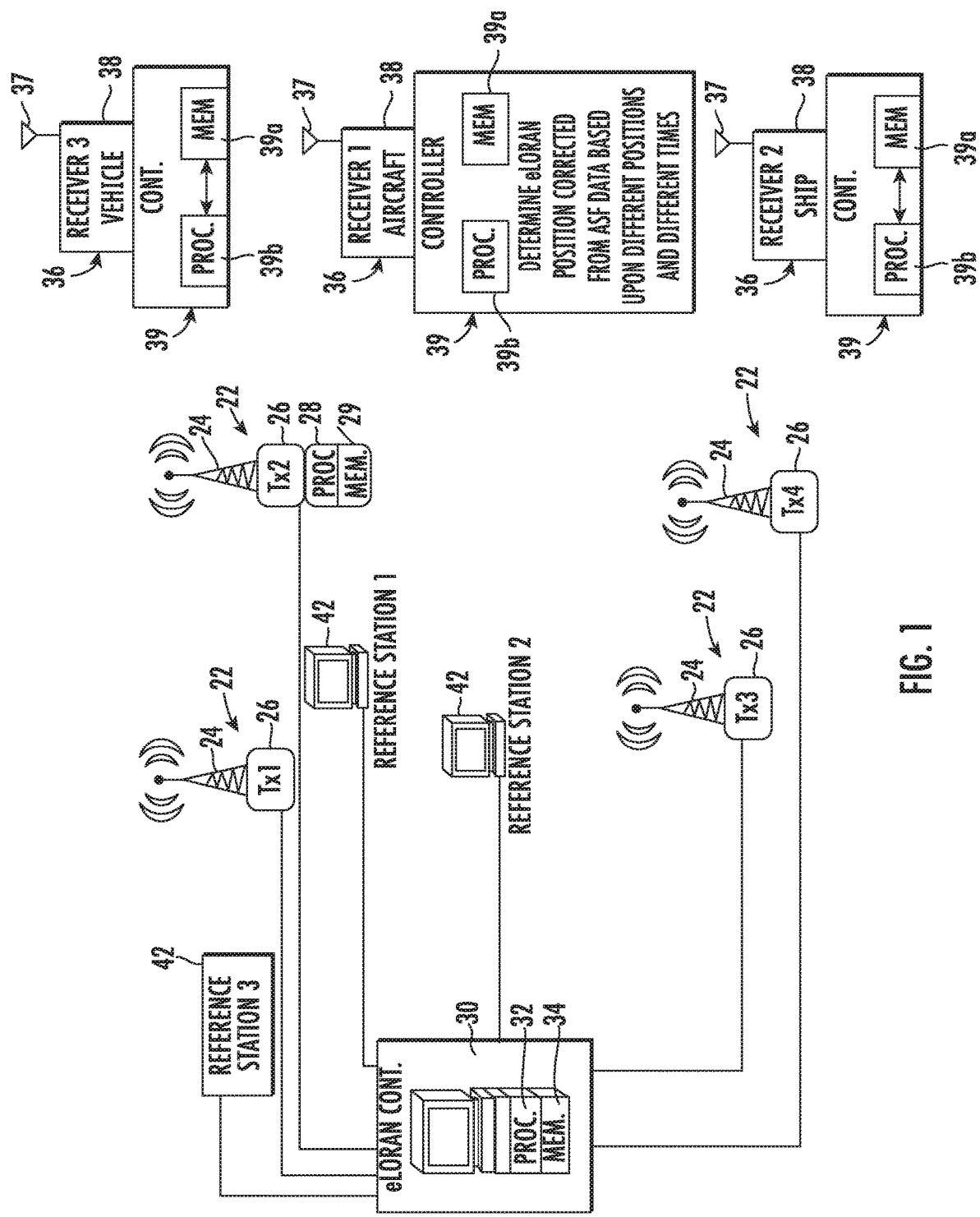
FIG. 1 is a schematic block diagram of an eLORAN system in accordance with an example embodiment.

Referring initially to FIG. 1, there is illustrated generally at 20 an enhanced LOng RAnge Navigation (eLORAN) system that includes a plurality of eLORAN transmitter stations 22, each including an eLORAN antenna 24 and eLORAN transmitter 26 coupled to the eLORAN antenna and configured to transmit data over an eLORAN data channel (LDC) and transmit a series of LORAN navigation RF pulses. Four eLORAN transmitter stations 22 are illustrated and labeled as TX1, TX2, TX3 and TX4, and as shown in the example of the eLORAN transmitter station 22 labeled TX2, each transmitter station includes a respective processor 28 and memory 29. Each of the eLORAN transmitter stations 22 is operatively connected to an eLORAN control station 30 that includes a processor 32 and memory 34 coupled thereto and configured to generate station specific eLORAN data and non-station specific eLORAN data that are received by users operating eLORAN receiver devices 36, which could be located in an aircraft, ship or terrestrial land vehicle, and illustrated schematically with Receiver 1 in an aircraft and Receiver 2 in a ship, and Receiver 3 in a land mobile vehicle.

Each eLORAN receiver device 36 includes an eLORAN receive antenna 37 and an eLORAN receiver 38 coupled to the eLORAN receive antenna. A controller 39 is coupled to the eLORAN receiver 38 and configured to cooperate with the plurality of eLORAN transmitter stations 22 to determine an eLORAN receiver position and receiver clock error corrected from Additional Secondary Factor (ASF) data. This ASF data is based upon different geographical positions and different times such as different seasons and different times of day for each different geographical position. The controller 39 includes a memory 39a configured to store the ASF data, and a processor 39b operating with the memory as explained in greater detail below. The controller 39 may be configured to receive updated ASF data via a wireless data channel or via an eLORAN data channel. Corrections may be based on at least one interpolation from this ASF data.

The control station 30 is connected to at least one eLORAN reference station 42, and at least one of the eLORAN reference stations operates as a differential eLORAN reference station. At least one of the reference stations 42 monitors the LORAN navigation RF pulses and processes data related to the RF pulses to determine ASF differential corrections and transmit information regarding those navigation RF pulses to the eLORAN control station 30 via the eLORAN data channel. In this example as illustrated, the eLORAN system 20 includes three eLORAN reference stations 42.

The eLORAN system 20 is a positioning, navigation and timing (PNT) service used for aviation, maritime and land-mobile vehicle navigation as well a fixed station timing for users. As a location and timing system, it may complement the Global Navigation Satellite Systems (GNSS). The eLORAN transmissions are synchronized to an identifiable, publicly-certified source of coordinated universal time (UTC) independent of the GNSS, and thus, may operate independently of the GNSS. The eLORAN system 20 includes the additional eLORAN data channel on the transmitted signal, thus distinguishing the eLORAN system from traditional LORAN-C systems. This eLORAN data channel transmits application-specific corrections, warnings and signal integrity information, including station specific eLORAN data such as station identification and differential eLORAN corrections and non-station specific eLORAN data such as almanac information, including reference station latitude, reference station longitude, and a reference station correction list.

The eLORAN system 20 includes Primary Factor (PF) data, Secondary Factor (SF) data, and Additional Secondary Factors (ASF) data to allow optimum performance for eLORAN receiver devices 36. The primary factor (PF) data accounts for the time of propagation of the LORAN navigation RF pulses through the atmosphere based on the speed of light in atmosphere. The eLORAN system 20 provides a value of the speed of light in the atmosphere usually at about 161,829 nautical miles/second, which is equivalent to about 299,707,308 meters per second. These values can vary slightly depending on which value is used for speed of light and other related variables, such as values supplied by the United States Coast Guard. Alternative definitions may specify the primary factor as a difference in propagation time between a signal traversing through vacuum versus the atmosphere.

The secondary factor (SF) accounts for the difference in propagation time for a LORAN navigation RF pulse originating from an eLORAN transmitter station 22 and propagating its signal over an all seawater path, rather than through the atmosphere in the absence of seawater path. The Additional Secondary Factor (ASF), on the other hand, is the extra delay based on the time-of-arrival (TOA) of the LORAN navigation RF pulses due to propagation over a non-homogenous, rough land path, such as elevated terrain, as opposed to over ocean water. This ASF delay can be significant and usually each eLORAN receiver device 36 makes a rough estimate based on stored ASF data stored at the receiver to achieve accuracy in tens to hundreds of meters. The ASF data can vary spatially and temporarily, and thus, ASF grid and differential LORAN corrections are used to account for the temporal and spatial variations. Differential LORAN corrections that are established by the eLORAN reference stations 42, often are used to compensate for the lack of accuracy with standard ASF maps.

Usually a service provider publishes a table of values as a map with an ASF grid for a nominal ASF to improve the accuracy of eLORAN receiver devices 36. Each eLORAN receiver device 36 includes an ASF grid stored in its memory 39a, indicating the relative local variations of the ASF relative to the nominal value for the region, and may be provided at intervals that are in the order of hundreds of meters. The differential corrections received from the reference stations 42 may be used to account for the residual ASF that is not corrected for by the ASF grid when an eLORAN receiver device 36 is in the vicinity of reference stations 42, for example, when located in a crowded metropolitan area or an important seaport where numerous reference stations 42 would be incorporated into the eLORAN system 20.

Although the ASF data that an eLORAN receiver device 36 encounters in any given location provides some correction, the ASF data used to supply this correction is highly dependent on temporal factors that can fluctuate on a daily (diurnal) and seasonal basis. Sparsely populated areas typically will not incorporate eLORAN reference stations 42 with the result that many areas of the Continental United States (CONUS) will have less accurate eLORAN position and timing solutions. This is acceptable in some cases where eLORAN positioning accuracy is less critical. This eLORAN positioning accuracy is compromised since the same stored ASF map for each eLORAN transmitter station 22 is used regardless of the time of day or month of year, causing positioning discrepancies that can be hundreds of feet, e.g., as much as 200 feet as shown in the graphs of FIGS. 2 and 3, and as much as 1,200 feet as shown in the graph of FIG. 4.

Figure 2:
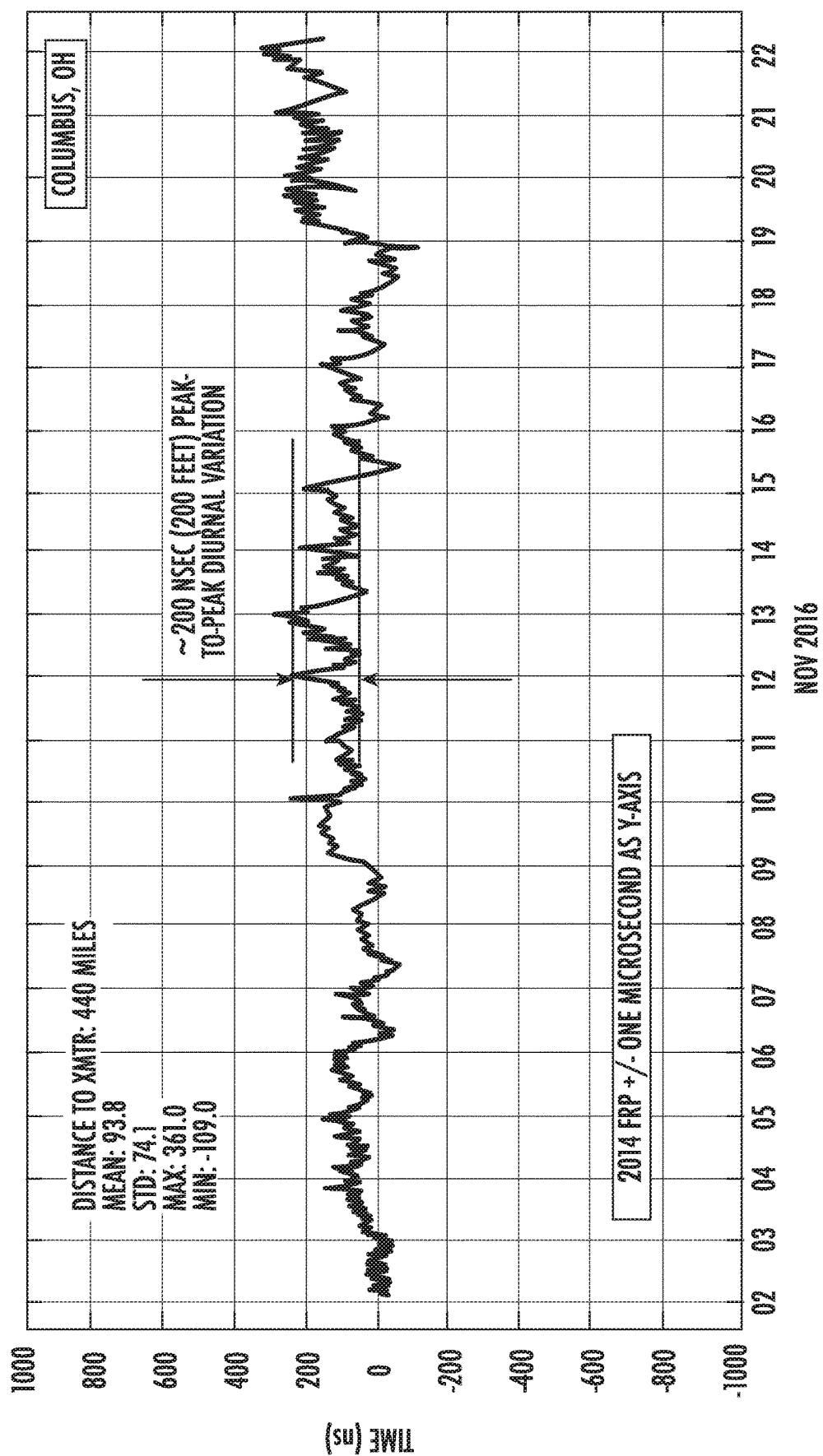
FIG. 2 is a graph showing an example of daily ASF variations.
Figure 3:
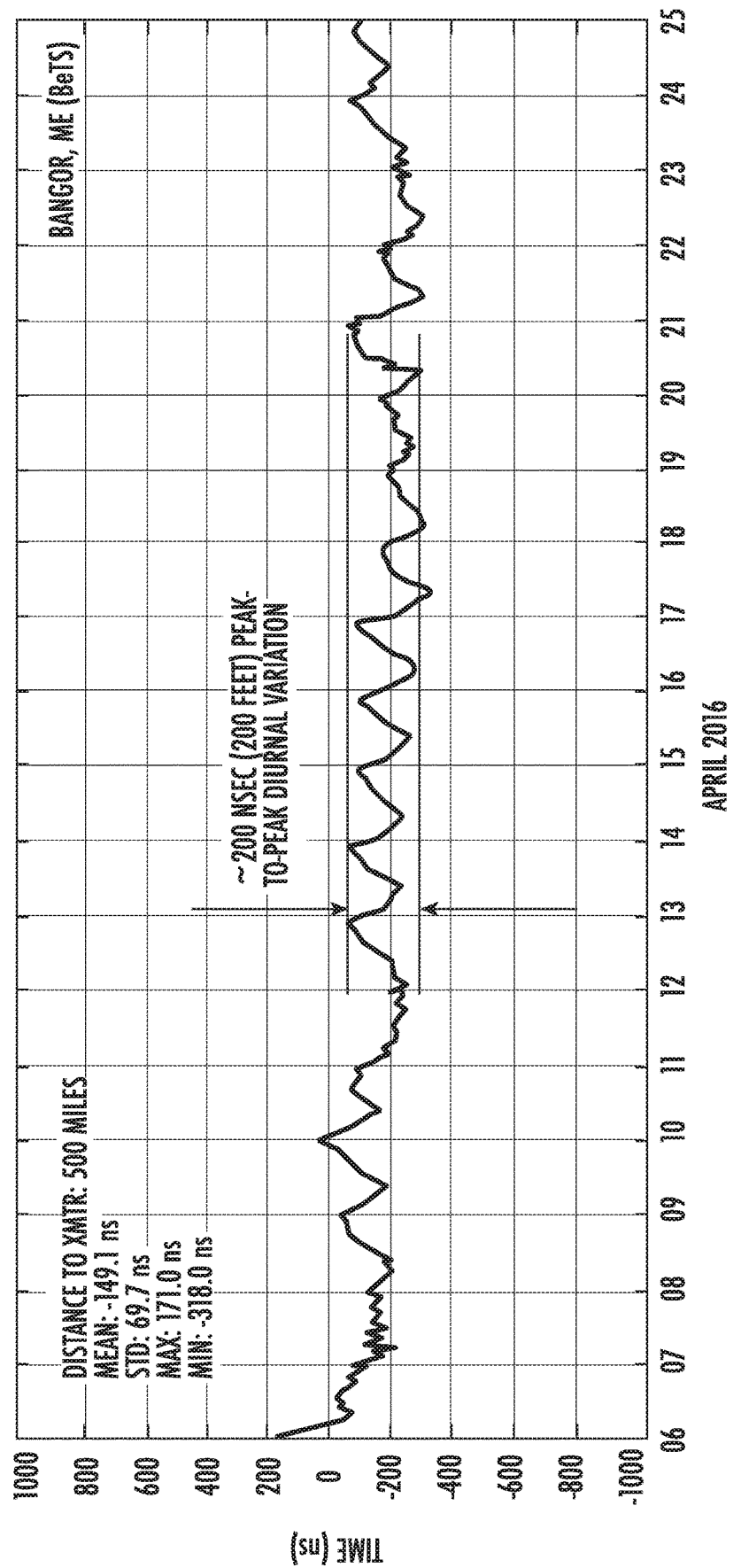
FIG. 3 is a graph similar to that of FIG. 2 and showing another example of daily ASF variations.

Referring to FIGS. 2 and 3, there are illustrated examples of the daily ASF variations that occur when transmitting the RF navigation pulses from a fixed eLORAN transmitter station 22, which is located in these examples at Wildwood, N.J., and transmitting to Columbus, Ohio (FIG. 2) and to Bangor, Maine (FIG. 3). One nanosecond of time error in each graph corresponds to approximately one foot of distance as a pseudo range error. Thus, a 200 nanosecond error in a peak-to-peak daily (diurnal) variation corresponds to a 200 foot pseudo range error. The graphs in FIGS. 2 and 3 correspond to the 2014 Federal Radio Navigation Plan, with the daily ASF variation shown in FIG. 2 for November 2016, and in FIG. 3 for April 2016.

Figure 4:
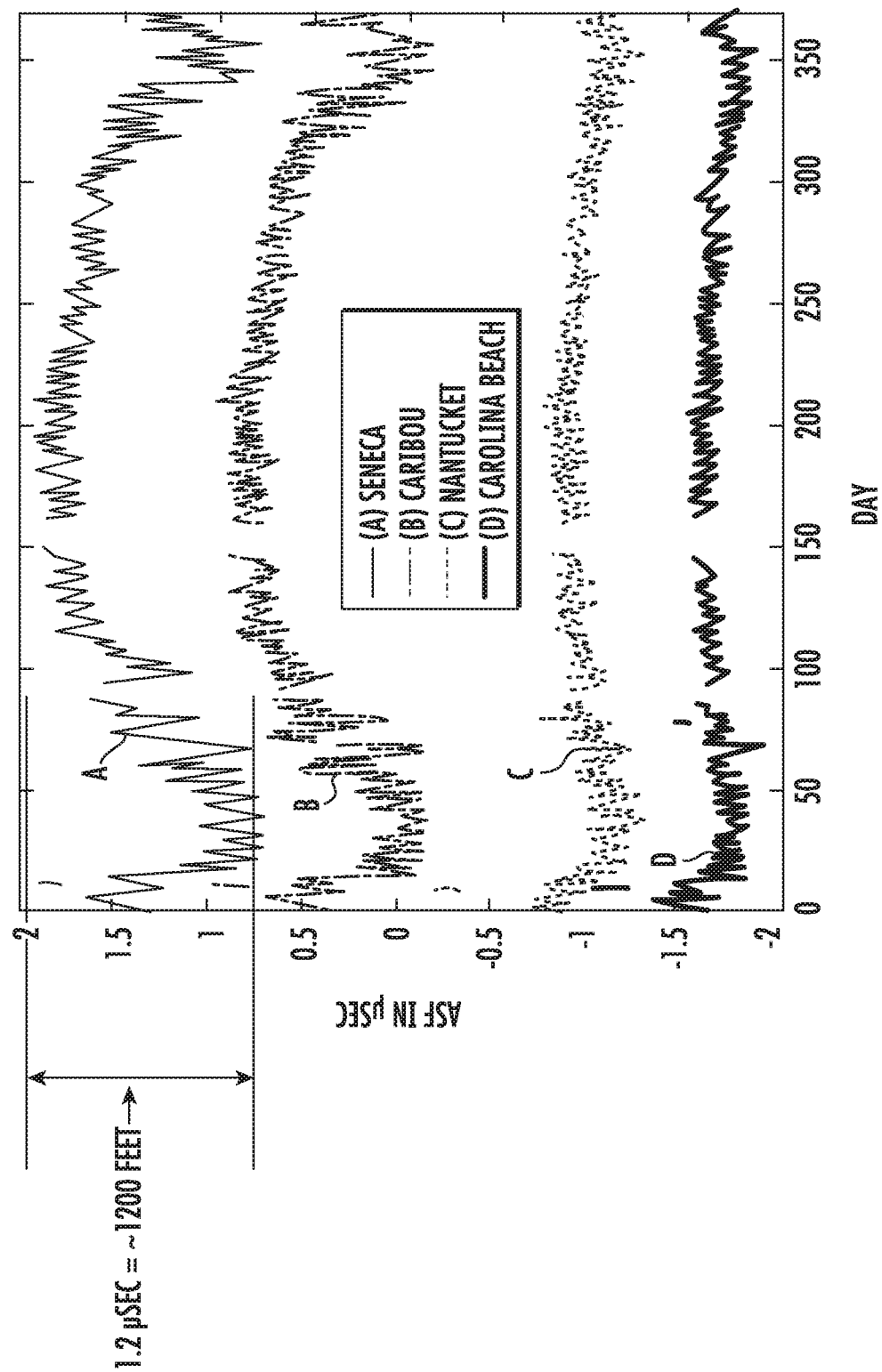
FIG. 4 is a graph showing the daily and monthly ASF variations from four different eLORAN transmitter stations.
Figure 5A:
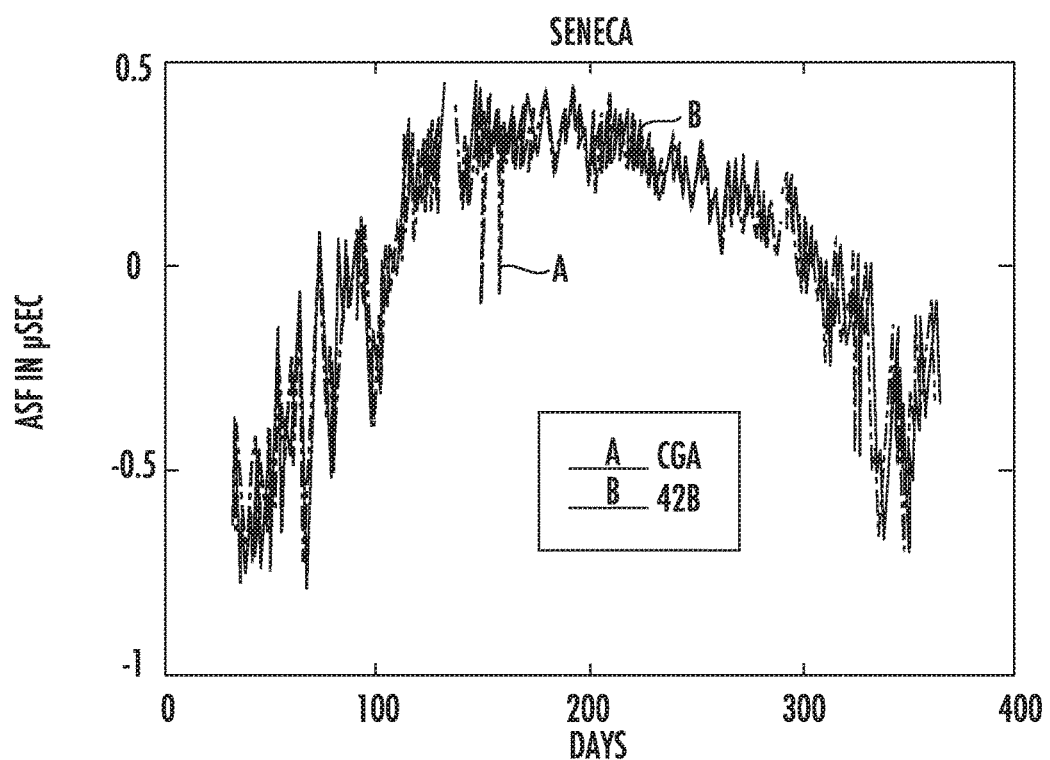
FIG. 5A is a graph showing the daily and monthly ASF variations for two different signal paths when the eLORAN transmitter station is located at Seneca.
Figure 5B:
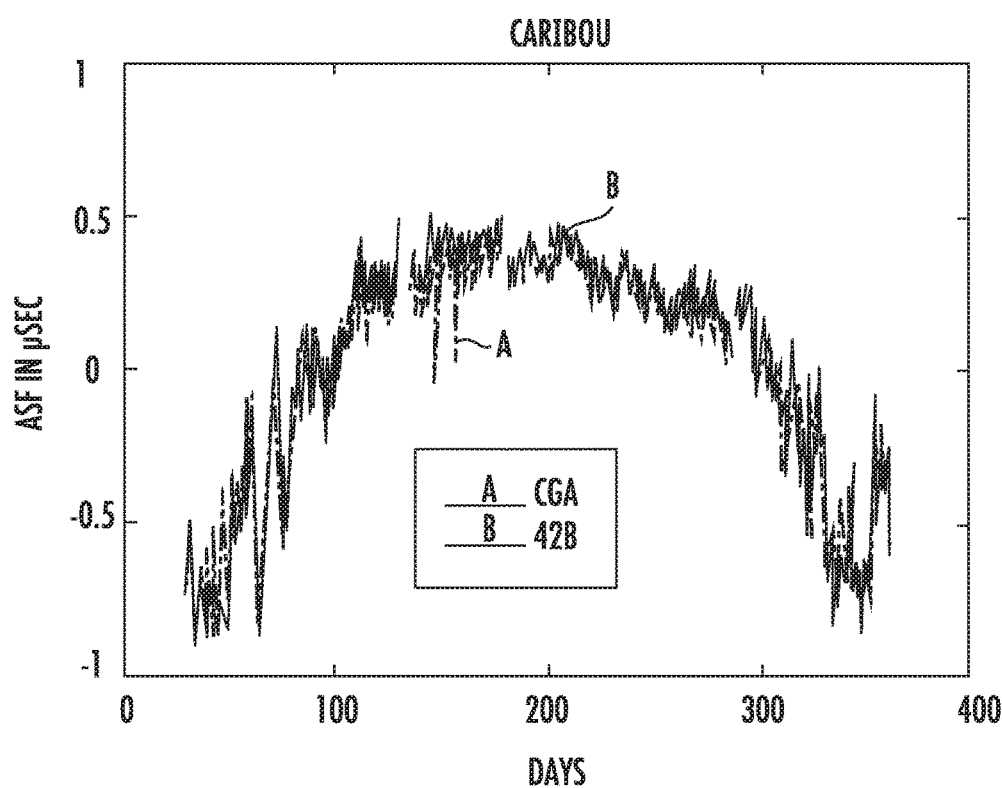
FIG. 5B is a graph similar to that shown in FIG. 5A and showing the daily and monthly ASF variations when the eLORAN transmitter station is located at Caribou.
Figure 5C:
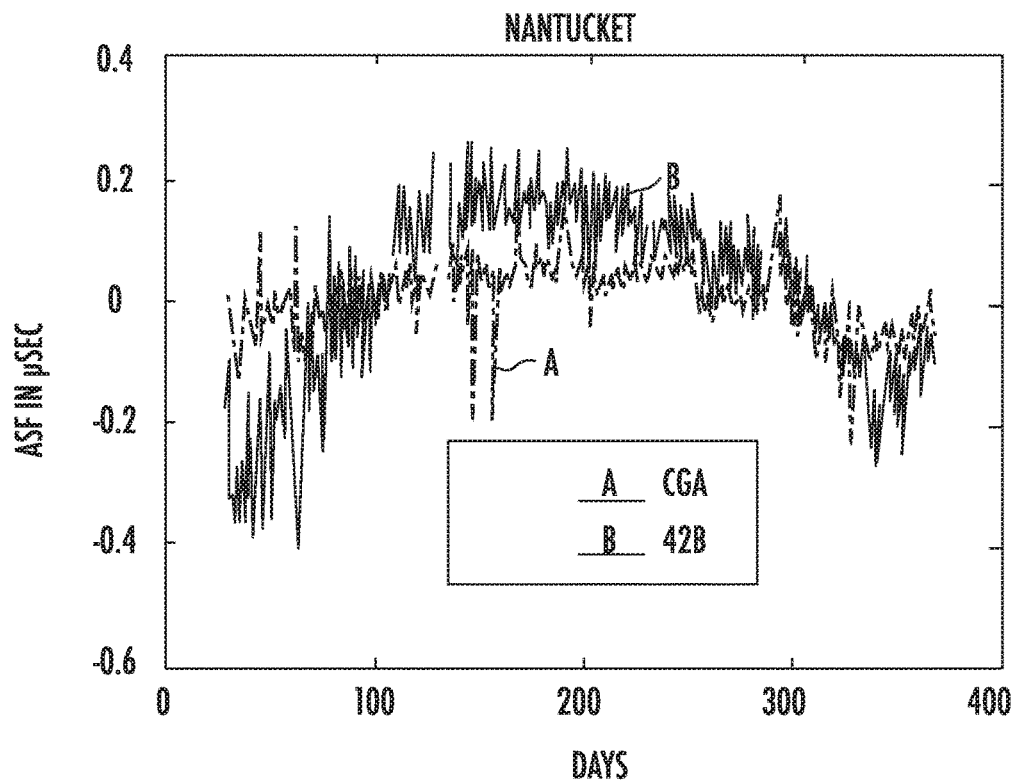
FIG. 5C is a graph similar to that of FIG. 5A and showing the daily and monthly ASF variations when the eLORAN transmitter station is located at Nantucket.
Figure 5D:
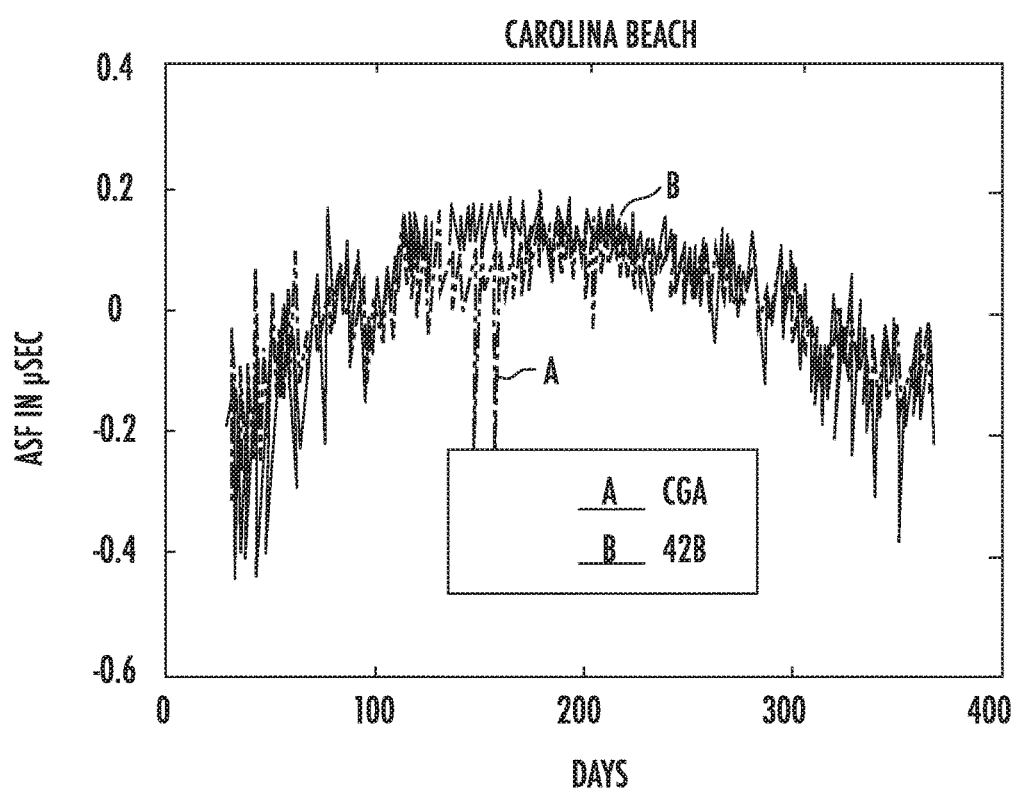
FIG. 5D is a graph similar to that of FIG. 5A and showing the daily and monthly ASF variations when the eLORAN transmitter station is located at Carolina Beach.

Referring more specifically to FIG. 4, there are illustrated examples of the daily (diurnal) and monthly ASF variations from four eLORAN transmitter stations 22 located at different locations identified as Seneca (A), Caribou (B), Nantucket (C), and Carolina Beach (D). The graphs show the comparisons in the daily and monthly ASF variations for the signals received at one eLORAN receiver device 36. In this example, one (1) nanosecond of time error also corresponds to about 1 foot of distance or pseudo range error. This modeling was based upon year 2007 daily and seasonal data. In the graphs, a delay of about 1.2 microseconds corresponds to about a 1,200 foot error in pseudorange as noted in the distance between parallel lines extending on the uppermost graph line, corresponding to the Seneca eLORAN transmitter station 22 site. The distance between the vertical lines corresponds to a 24 hour daily ASF variation, which is expressed over the full year to account for monthly and seasonal ASF variations. The daily ASF variation is superimposed on a much more slowly varying error that changes monthly and annually over the four seasons of the year. For example, the winter season corresponding to the beginning of each of the graphs has a lower daily ASF value variation than the variation occurring during the summer and fall seasons, which is higher as illustrated. The ASF variation differs from one path to another, for example, the Seneca and Caribou graphs (A and B) corresponding to different terrains as compared to the graphs for Nantucket and Carolina Beach (C and D), which have a partial seawater path where ASF values in that case are zero (0) over seawater. These ASF variations are a strong function of the conductivity of the earth surface over which the LORAN navigation RF pulses traverse. Thus, when the LORAN RF pulses traverse over rocky terrain, the ASF variation would be different than when the LORAN RF pulses traverse over rich fertile farmland. Thus, there are visible magnitudes in variation between the four curves in FIG. 4.

A similar comparison for daily and monthly ASF variations is shown in the graphs of FIGS. 5A through 5D, showing the graphs for the four transmitter stations of Seneca (FIG. 5A), Caribou (FIG. 5B), Nantucket (FIG. 5C), and Carolina Beach (FIG. 5D), with each graph depicting the variation based on eLORAN receiver devices 36 located at the Coast Guard Academy (CGA) and Goodspeed Airport (42B) in East Haddam, Connecticut, and with respective curves labeled A and B on these graphs. This modeling is based on year 2007 data.

In accordance with a non-limiting example, each eLORAN receiver device 36 may include ASF correction curves, e.g., look-up tables, stored in the memory 39a and corresponding to the path from each eLORAN transmitter station 22. Data corresponding to these correction curves is used to determine an eLORAN receiver position and receiver clock error corrected from the ASF data, which is based upon the different geographical positions at different times for each different geographical position. This additional ASF data will compensate for different times of day and different days and seasons, such as each month, and the overall position accuracy of an eLORAN receiver device 36 is improved when those dynamic ASF corrections received from reference stations 42 are unavailable or an eLORAN receiver device is outside the reference station's effective coverage area, usually a circle having a 30 to 35 kilometer radius. Instead of storing only a single ASF map for each eLORAN transmitter station 22 within each memory 39a of the eLORAN receiver device 36, a number of ASF correction curves or look-up tables per eLORAN transmitter station are stored in the memory of each eLORAN receiver device. This data is usually loaded during device manufacture at the factory, in order to reflect the daily and seasonal/monthly changes to the static ASF values, but could be uploaded to a receiver device 36 via a wireless channel or eLORAN data channel.

Any data used to generate dynamic ASF corrections would have been previously processed and recorded at every reference station 42. For example, for each eLORAN transmitter station 22, an eLORAN receiver at a reference station device 36 could store the daily ASF corrections as "deltas" in a look-up table for the fixed ASF map values. There could be a single daily (diurnal) variation look-up table for each eLORAN transmitter station 22 and provided for each month of the year. Thus, the total quantity of storage required in the receiver memory 39a would be reasonable and not require an excess of data storage capacity. In the absence of the dynamic ASF correction data provided by reference stations 42, such as when the eLORAN receiver device 36 is located outside of a metropolitan area or an important port area having many reference stations, the eLORAN position and timing error performance can be significantly improved, as compared to the positioning acquired at an eLORAN receiver device 36 using only the single ASF map throughout the year. The fixed ASF map and the multiple ASF correction curves reflect the daily and monthly ASF changes for a given area. The controller 39 may be configured to generate the eLORAN correction based upon at least one interpolation from that ASF data since that data will usually be obtained by accumulation over a spaced grid pattern and over different times of day and different seasons.

ASF data may also be received as updated data via the wireless data channel or an eLORAN data channel and operate as an update to the data that had been previously stored during manufacture of the eLORAN receiver devices 36. The monthly and daily ASF correction data can be accumulated and calculated also based on periodic observations at all reference stations 42 such that when an eLORAN receiver device 36 is outside the coverage area of a reference station, the controller 39 chooses stored ASF correction data for each eLORAN transmitter station 22 in view, and based on the current season and time of day, uses that data to determine the correct ASF value to be applied. These ASF maps can be frequently updated as noted before and data redistributed via a wireless data channel or the eLORAN data channel, including use of WiFi, Bluetooth, cellular, USB and other communication systems for greater accuracy. The previous systems, on the other hand, used a single ASF map such as provided by the United States Coast Guard. This one time single ASF map was published as a text document and provided to receiver manufacturers as a one-time load into memory.

There now follows further description for the general operation of the eLORAN system 20 described above. Common messages are transmitted from the eLORAN transmitter stations 22 and may include encryption keys to encrypt messages. These keys are typically changed frequently. In some systems, the keys may be changed daily and in other systems the keys may be changed even for different messages. Common messages may also include receiver control messages, broadcast messages and almanac information, which may include reference station latitude, reference station longitude and reference station correction lists. Other data in the common messages may include station identification data, differential eLORAN corrections, and the UTC time. The differential corrections may include data related to time differential corrections and position differential corrections.

The eLORAN system 20 includes accommodation for a medium GRI (Group Repetition Interval), which corresponds to the time duration of the sequence of pulses, and may include a sequence of timing pulses as master and secondary pulses. Generally, the group repetition interval corresponds to the specified time interval for all eLORAN transmitter stations 22 of a chain to transmit their pulse groups. For each chain, a minimum group repetition interval is selected of sufficient duration to provide the time for each eLORAN transmitter station 22 to transmit its pulse group and an additional time period between each pulse group so that signals from two or more transmitter stations do not overlap in time within the coverage area. The group repetition interval is normally calculated in units of tens of microseconds and given a whole number designation as a standard. For example, the group repetition interval having 69,950 microseconds corresponds to the GRI referred to as "6995," which, for a certain application of the LDC can produce 143 messages over two minutes. This eLORAN data channel has a low data rate usually of about 50 to 100 bits per second, depending on GRI value, and provides these multiple messages to a user operating an eLORAN receiver device 36 to support the accuracy, integrity and availability requirements in the eLORAN system 20.

There now follows further details of the general operation of the eLORAN system 20 with its plurality of eLORAN transmitter stations 22, and their cooperation with the reference stations 42. The eLORAN control station 30 and the reference stations 42 do not interfere with the timing control of any transmitted signals, and the reference stations 42 as noted before may provide augmentation data and may provide real-time corrections to published ASF (Additional Secondary Factor) maps for a complete maritime or other terrestrial coverage area, and provide ASF grid data with nominal propagation corrections per eLORAN transmitter station 22. Thus, a user operating one or more eLORAN receiver devices 36 may apply both the ASF's from the map and any differential eLORAN corrections received over the eLORAN data channel to improve positioning accuracy. An eLORAN reference station 42 will calculate and transmit phase (i.e., time) corrections continuously. As noted before, the eLORAN system 20 signal structure is between a 90 and 110 kHz frequency band and with a pulse signal usually at about a 100 kHz carrier frequency. The eLORAN signal usually has groups of eight to ten pulses that are spaced about 1 millisecond in a TDMA structure. The transmission of groups repeats every group repetition interval (GRI). As many as five different eLORAN transmitter stations 22 may share the same group repetition interval to form a chain with a master and secondary transmissions. The eLORAN signal envelope shape identifies a reference of zero-crossing, which is synchronized to the UTC. The transmitted signals may be phase coded 0 or 180° for master/secondary identification and mitigation against multiple hop sky waves.

As a non-limiting example, those skilled in the art will understand that different implementations of the eLORAN data channel may exist, such as a three-state pulse position modulation known as the Eurofix modulation system that is standardized by the RTCM and ITU, a 9th pulse modulation system or a $9^{th}$-$10^{th}$ pulse modulation system. The first two modulation systems provide equal data bandwidth of approximately 20 to 50 BPS, while the third provides approximately 100 bps. All modulation systems are protected by Reed-Solomon forward error correcting code to counter the effects of noise. The Eurofix modulation system has a pulse position modulation of pulses 3 . . . 8 by +1, 0, −1 microseconds, while the $9^{th}$ and $9^{th}$-$10^{th}$ pulse modulation systems have the additional $9^{th}$ or $9^{th}$ and $10^{th}$ pulses of 32 possible delay values between 0 and 158.75 microseconds. In the Eurofix modulation system as noted before, the pulses are pulse position modulated (ppm) plus or minus (one) 1 microsecond. There are about 729 possible modulation patterns and the pulse position modulated encoding uses about 128 of a possible 141 balanced patterns to represent 7 bits of data per group repetition interval. The data rate may be about 70 to 175 bits per second based on the group repetition interval and uses the Reed-Solomon forward error correction technique. In an example, the Eurofix message length is fixed at about 210 bits having 37-bit words.

With the 9th pulse modulation system, the pulse is inserted 100 microseconds after the 8th pulse and may use 32-state pulse-position modulation to encode the data at a data rate of about 5 bits per GRI.

The eLORAN system 20 includes the differential eLORAN corrections transmitted within the eLORAN data channel, which may contain ASF phase correction data from a differential eLORAN reference station 42. The almanac information may include the reference station latitude, reference station longitude, and a reference station correction list as noted before. The reference station correction list may have messages that contain the signal ID codes for the corrections from a particular differential eLORAN reference station 42.

In one example, as understood by those skilled in the art, it is possible that the Eurofix modulation system may have 56 bits as a DGPS message. A message may have 14 bits as a cyclic redundancy check for data link integrity, and 140 bits for the Reed-Solomon parity. In addition, 210 bits may correspond to 30 GRI's of 7 bits per message, and thus, correspond to about 1.2 to about 3 seconds per message. The 9th pulse modulation system may have a 32 state pulse position modulation (5 bits/GRI) corresponding to 3 bits phase and 2 bits envelope and phase.

In operation, the eLORAN receiver devices 36 will have a position calculation based on three or more pseudo ranges to three or more eLORAN transmitter stations 22. An eLORAN receiver device 36 will measure the arrival times, which convert to pseudo ranges by multiplication with the signal's propagation velocity. It should be understood that this propagation velocity is not equal to the speed of light in a vacuum, but rather depends on the medium the signals travel in and over, such as in atmosphere, over sea, over land, or over mountains. The calculations take into effect the true range, the primary factor (PF), the secondary factor (SF), and the additional secondary factor (ASF), together with the variation in those factors and any remaining measurement errors. The receiver clock bias (i.e., time error) is automatically determined as part of the position calculation process. As noted before, the primary factor delay accounts for the difference between propagation of the signal in the earth's atmosphere as opposed to in free space and the secondary factor delay accounts for signal propagation over sea water, especially the ocean. The primary factor and secondary factor are known and considered constant and an eLORAN receiver 36 uses a model to calculate these delays as a function of the estimated range from the receiver to the transmitters.

The additional secondary factor (ASF) delay build-up depends on the type of soil and other factors and is the total cumulative delay the signal experiences over sections with different ground conductivity. An ASF map may be provided for an operating area as a grid with a survey of nominal ASF's for each eLORAN transmitter station 22. By not taking the ASF's into account, this could result in positioning errors of several hundred meters to even kilometers. ASF's are published as a map with an ASF grid for each eLORAN transmitter station 22.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An enhanced LOng RAnge Navigation (eLORAN) system comprising:
   a plurality of eLORAN transmitter stations, wherein each eLORAN transmitter station comprises an eLORAN transmit antenna, and an eLORAN transmitter coupled to the eLORAN transmit antenna and configured to transmit a series of eLORAN navigation RF pulses; and
   at least one eLORAN receiver device comprising
      an eLORAN receive antenna,
      an eLORAN receiver coupled to the eLORAN receive antenna, and
      a controller coupled to the eLORAN receiver and configured to cooperate with said plurality of eLORAN transmitter stations to determine an eLORAN receiver position and receiver clock error corrected from additional secondary factor (ASF) data, the ASF data based upon different geographical positions and different times for each different geographical position wherein said controller comprises a memory configured to store the ASF data, and a processor cooperating with the memory, said ASF data comprising a fixed ASF map for each of the plurality of eLORAN transmitter stations, and a plurality of diurnal variation look-up tables for every month and for each eLORAN transmitter station, wherein said processor is configured to generate eLORAN corrections based upon at least one interpolation from the fixed ASF map and from each of the diurnal variation look-up tables for the current month for those eLORAN transmitter stations from which the at least one receiver device receives eLORAN navigation RF pulses.

2. The eLORAN system of claim 1 wherein said diurnal variation look-up tables comprise data for different times of day.

3. The eLORAN system of claim 1 wherein said controller is configured to receive updated ASF data, the updated ASF data comprising updated diurnal variation look-up tables.

4. The eLORAN system of claim 3 wherein said controller is configured to receive updated ASF data via a wireless data channel.

5. The eLORAN system of claim 3 wherein said controller is configured to receive updated ASF data via an eLORAN data channel.

6. The eLORAN system of claim 1 comprising a plurality of eLORAN reference stations cooperating with said plurality of eLORAN transmitter stations.

7. An enhanced LOng RAnge Navigation (eLORAN) receiver device comprising:
   an eLORAN receive antenna;
   an eLORAN receiver coupled to the eLORAN receive antenna; and
   a controller coupled to the eLORAN receiver and configured to cooperate with a plurality of eLORAN transmitter stations that each transmit a series of eLORAN navigation RF pulses to determine an eLORAN receiver position and receiver clock error corrected from additional secondary factor (ASF) data, the ASF data based upon different geographical positions and different times for each different geographical position, wherein said controller comprises a memory configured to store the ASF data, and a processor cooperating with the memory, said ASF data comprising a fixed ASF map for each of the plurality of eLORAN transmitter stations, and a plurality of diurnal variation look-up tables for every month and for each eLORAN transmitter station, wherein said processor is configured to generate eLORAN corrections based upon at least one interpolation from the fixed ASF map and from each of the diurnal variation look-up tables for the current month for those eLORAN transmitter stations from which the receiver receives eLORAN navigation RF pulses.

8. The eLORAN receiver device of claim 7 wherein said diurnal look-up table comprises data for different times of day.

9. The eLORAN receiver device of claim 7 wherein said controller is configured to receive updated ASF data, the updated ASF data comprising updated diurnal variation look-up tables.

10. The eLORAN receiver device of claim 9 wherein said controller is configured to receive updated ASF data via a wireless data channel.

11. The eLORAN receiver device of claim 9 wherein said controller is configured to receive updated ASF data via an eLORAN data channel.

12. A method for enhanced LOng RAnge Navigation (eLORAN) position determining using an eLORAN receiver device comprising an eLORAN receive antenna, an eLORAN receiver coupled to the eLORAN receive antenna, and a controller coupled to the eLORAN receiver, the method comprising:

operating the controller to cooperate with a plurality of eLORAN transmitter stations that each transmit a series of eLORAN navigation RF pulses, to determine an eLORAN receiver position and receiver clock error corrected from additional secondary factor (ASF) data, the ASF data based upon different geographical positions and different times for each different geographical position; and storing the ASF data within a memory of the eLORAN receiver device having a processor cooperating with the memory, wherein the ASF data comprises a fixed ASF map for each of the plurality of eLORAN transmitter stations, and a plurality of diurnal variation look-up tables for every month and for each eLORAN transmitter station, wherein the processor is configured to generate eLORAN corrections based upon at least one interpolation from the fixed ASF map and from each of the diurnal variation look-up tables for the current month for those eLORAN transmitter stations from which the receiver device receives eLORAN navigation RF pulses.

13. The method of claim 12 wherein the diurnal variation look-up tables comprises data for different times of day.

14. The method of claim 12 wherein operating the controller comprises operating the controller to receive updated ASF data, the updated ASF data comprising updated diurnal variation look-up tables.

* * * * *